United States Patent [19]

Hardy et al.

[11] Patent Number: 5,640,496
[45] Date of Patent: Jun. 17, 1997

[54] METHOD AND APPARATUS FOR MANAGEMENT OF IMAGE DATA BY LINKED LISTS OF PIXEL VALUES

[75] Inventors: Tyrone L. Hardy; Laura D. Brynildson, both of Albuquerque, Calif.

[73] Assignee: Medical Instrumentation and Diagnostics Corp. (Midco), San Diego, Calif.

[21] Appl. No.: 651,427

[22] Filed: Feb. 4, 1991

[51] Int. Cl.⁶ .................................................. G06T 15/40
[52] U.S. Cl. ........................ 395/121; 395/135; 395/133
[58] Field of Search ........................ 395/121, 135, 395/133, 158, 122, 164, 165; 340/734; 345/113, 114

[56] References Cited

U.S. PATENT DOCUMENTS

| | | | |
|---|---|---|---|
| 3,508,552 | 4/1970 | Hainault | 128/303 |
| 4,079,450 | 3/1978 | Grimm et al. | 364/200 |
| 4,123,143 | 10/1978 | Yachim et al. | 350/171 |
| 4,223,227 | 9/1980 | Horwitz | 250/491 |
| 4,230,117 | 10/1980 | Anichkov | 128/303 B |
| 4,259,725 | 3/1981 | Andrews et al. | 364/521 |
| 4,278,888 | 7/1981 | Wagner | 250/445 T |
| 4,341,220 | 7/1982 | Perry | 128/630 |
| 4,350,159 | 9/1982 | Gouda | 128/303 B |
| 4,386,602 | 6/1983 | Sheldon et al. | 128/4 |
| 4,463,758 | 8/1984 | Patil et al. | 128/303 B |
| 4,475,104 | 10/1984 | Shen | 395/122 X |
| 4,502,147 | 2/1985 | Michaels | 378/206 |
| 4,583,538 | 4/1986 | Onik et al. | 128/303 B |
| 4,594,673 | 6/1986 | Holly | 395/121 |
| 4,597,380 | 7/1986 | Raif et al. | 128/6 |
| 4,598,368 | 7/1986 | Umemura | 364/414 |
| 4,608,635 | 8/1986 | Osterholm | 364/414 |
| 4,608,977 | 9/1986 | Brown | 128/303 B |
| 4,617,925 | 10/1986 | Laitinen | 128/303 B |
| 4,638,798 | 1/1987 | Shelden et al. | 128/303 B |
| 4,651,732 | 3/1987 | Frederick | 128/303 R |
| 4,653,112 | 3/1987 | Ouimette | 382/69 |
| 4,706,665 | 11/1987 | Gouda | 606/130 |
| 4,729,098 | 3/1988 | Cline et al. | 364/414 |
| 4,737,921 | 4/1988 | Goldwasser et al. | 395/121 |
| 4,777,598 | 10/1988 | Kellar et al. | 364/413.22 |
| 4,790,026 | 12/1988 | Gennery et al. | 382/49 |
| 4,791,934 | 12/1988 | Brunnett | 128/653 |
| 4,813,588 | 3/1989 | Srivastava et al. | 228/103 |
| 4,827,445 | 5/1989 | Fuchs | 395/158 |
| 4,832,049 | 5/1989 | Matsushita et al. | 128/781 |
| 4,835,712 | 5/1989 | Drebin et al. | 395/123 |
| 4,856,528 | 8/1989 | Yang et al. | 128/653 |
| 4,879,668 | 11/1989 | Cline et al. | 364/522 |
| 4,884,566 | 12/1989 | Mountz et al. | 128/303 B |
| 4,888,713 | 12/1989 | Falk | 364/522 |
| 4,905,702 | 3/1990 | Foss | 128/665 |
| 4,907,174 | 3/1990 | Priem | 395/122 |
| 4,919,516 | 4/1990 | Petran et al. | 350/171 |

(List continued on next page.)

FOREIGN PATENT DOCUMENTS

| 2384481 | 11/1978 | France . |
| 1074239 | 4/1982 | U.S.S.R. . |

OTHER PUBLICATIONS

"Linked Lists" a chapter from Ellis Horowitz & Sartaj Sahni, *Fundamentals of Data Structures*, Rockville, Maryland; Computer Science Press 1982, pp. 106–112.

(List continued on next page.)

*Primary Examiner*—Raymond J. Bayerl
*Attorney, Agent, or Firm*—Deborah A. Peacock; Jeffrey D. Myers

[57] ABSTRACT

Method and apparatus for management of image data using dynamic image pixel management for composite image display of image data so that "overlayed" and transparent images may be displayed, changed, and redisplayed in real time. On redisplay, the invention returns values of only those pixels, the values of which have changed, or any subset of all pixels. The invention is independent of the hardware used to display images and permits true color with transparency regardless of the number of display hardware bit planes available.

60 Claims, 12 Drawing Sheets

U.S. PATENT DOCUMENTS

| | | | |
|---|---|---|---|
| 4,965,753 | 10/1990 | Kraemer | 395/121 |
| 4,977,505 | 12/1990 | Pelizzari | 364/413.19 |
| 5,099,846 | 3/1992 | Hardy | 128/653.1 |
| 5,123,085 | 6/1992 | Wells et al. | 395/121 |
| 5,159,663 | 10/1992 | Wake | 395/122 |
| 5,363,475 | 11/1994 | Baker et al. | 395/122 |
| 5,381,518 | 1/1995 | Drebin et al. | 395/121 X |

OTHER PUBLICATIONS

Chapter on "Sets" from Harry R. Lewis & Christos H. Papadimitrious, Elements of the Theory of Computation, Prentice–Hall, 1981 Englewood Cliffs NJ, pp. 5–6.

"The Storage Pools" a chapter from Ellis Horowitz & Sartaj Sahni Fundamentals of Data Structures, Computer Science Press, 1982 Rockville, Maryland, pp. 114–118.

"Computerized Optimization of $^{125}$I Implants in Brain Tumors" by B. Bauer–Kirpes, Ph.D., *J. Radiation Oncology Biol. Phys.* vol. 14, pp. 1013–1023 (1987).

"External Stereotactic Irradiation by Linear Accelerator" by F. Columbo, M.D., et al. *Neurosurgery*, vol. 16, No. 2; pp. 154–159 (1985).

"The University of Florida Radiosurgery System" by W.A. Friedman, M.D. 1989, Elsevier Science Publishing Company, Inc.

"Stereotactic CT Atlases," Tyrone L. Hardy, *Modern Stereotactic Surgery*, L.D. Lunsford, Ed., Boston, pp. 425–439 (1988).

"CASS: A Program for Computer–Assisted Stereotaxic Surgery," *Proceedings of the 5th Annual Symposium on Computer Application in Medical Care*, T.L. Hardy and J. Koch; Washington, D.C., 1981, pp. 1116–1126.

"Computer–Assisted Stereotactic Surgery," Hardy, T.L. and Koch, J.; *Appl. Neurophysiol.*, vol. 45, pp. 396–398 (1982).

"Computer Graphics with Computerized Tomography for Functional Neurosurgery," Hardy, T.L., Koch, J., and Lassiter, A., *Appl. Neurophysiol.*, vol. 46, pp. 217–226 (1983).

"A Portable Computerized Tomographic Method for Tumor Biopsy," Hardy, T.L., Lassiter, A., and Koch, J., *Acta. Neurochir.* [Suppl.], (Wien) p. 444 (1983).

"Computer–Assisted Stereotactic Laser Microsurgery for the Treatment of Intracranial Neoplasms" by P. Kelly et al. *Neurosurgery*, vol. 10, No. 3, pp. 324–331 (1982).

"Computer Simulation for the Stereotactic Placement of Interstitial Radionuclide Sources onto CT–Defined Tumor Volumes," Kelly et al., *Neurosurgery*, pp. 442–448 (1984).

"Stereotactic Surgical System Controlled by Computed Tomography" by M. Koslow, M.D., et al. *Neurosurgery*, vol. 8, pp. 72–82 (1981).

"The Ill–Conditioning in Stereotaxic Irradiation: Optimization of Isodoses Arrays Distribution Using the Singular Values Decomposition," Conference *Eighth International Conference*, Jun. 8–10, 1988.

"Exploring Design Space: Optimization as Synthesizer of Design and Analysis" by A.R. Parkinson et al. *Computers in Mechanical Engineering*, Mar. 1985, pp. 28–36.

"The Role of Computed Tomography and Digital Radiographic Techniques in Stereotactic Procedures for Electrode Implantation and Mapping, and Lesion Localization," by T.M. Peters et al., *Appl. Neurophysiol.*, vol. 46, pp. 200–205 (1983).

"Measurements of Dose Distributions in Small Beams of 6MV X–Rays" by R.K. Rice et al. *Phys. Med. Biol.*, vol. 32, No. 9 (1987), pp. 1087–1099.

"Development of a Computerized Microstereotaxis Method for Localization and Removal of Minute CNS Lesions Under Direct 3–D Vision" by C.H. Sheldon et al. *Journal of Neurosurgery*, Technical Report, vol. 52, pp. 21–27 (1980).

"A System for Anatomical and Functional Mapping of the Human Thalamus" by C.J. Thompson et al. *Computers and Biomedical Research* (1977), pp. 9–24.

"A CT–Based Computerized Treatment Planning System for I–125 Stereotactic Brain Implants" by K. Weaver, Ph.D., et al. *J. Radiation Oncology Biol. Phys.*, vol. 18, pp. 445–454 (1989).

"Linear Accelerator as a Neurosurgical Tool for Stereotactic Radiosurgery" by K.R. Winston, M.D., et al. *Neurosurgery*, vo.1 22, No. 3 (1988), pp. 454–462.

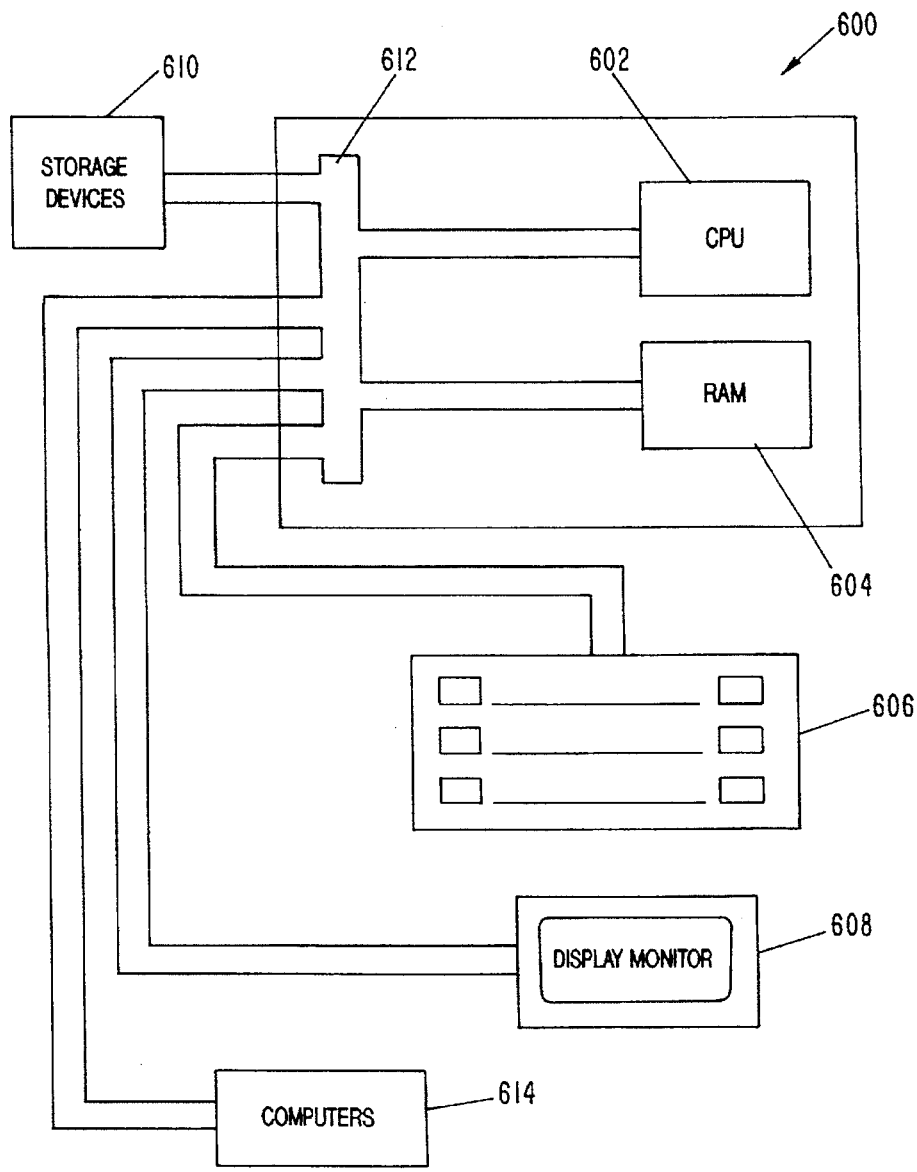
FIG—13
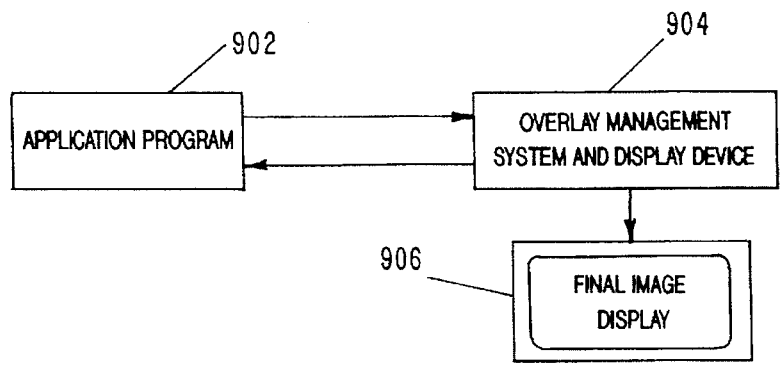
FIG—14

METHOD AND APPARATUS FOR MANAGEMENT OF IMAGE DATA BY LINKED LISTS OF PIXEL VALUES

BACKGROUND OF THE INVENTION

1. Field of the Invention (Technical Field)

The present invention relates to a method and apparatus for management of the display of image data, specifically where image data is "overlayed" on other image data. The invention is independent of the video display hardware used to display the overlayed images.

2. Background Art

There are primarily two methods in the art for display of overlayed image data. Both methods are based upon the bit plane concept of imaging. In this technique, digital images have variable two-dimensional matrix sizes generally extending from 64×64 to 2048×2048 or higher number of pixels per bit plane of resolution. This two-dimensional matrix can be extended in three-dimensional form by the addition of bit planes. Thus, the depth of resolution is determined by the number of bits per pixel which extends the matrix in a three-dimensional form. The greater the depth of resolution, i.e., the number of bit planes, the greater the capability of imaging overlay. The two principal methods of realizing overlays are as follows:

1. Hardware Overlay Technique. In this regard and by example, the bit plane overlay technique is somewhat analogous to stacked transparent cellophane planes upon which different data or images can be written, imprinted or simulated, such as shown in FIGS. 4 and 5. The information on each of these planes are overlayed one to another, and therefore, viewed as a composite picture on the video monitor. Such bit planes can be manipulated independently of each other in what is stated in the art as a non-destructive manner, i.e., by the use of such overlaying methods data is not overwritten in the same plane. In addition, the greater the number of bit plane overlay capabilities, the greater the range of color and color simulation available.

In the development of this art, image manipulation systems have successively added more bit plane capabilities by means of additional display and processing hardware. Certain manufacturers of such systems, for example, Silicon Graphics Computer Systems, have as many as 64 bit planes or bits per pixel as part of their image processing capabilities. The method for such hardware design is one of redundancy in which successive hardware image processing memory boards are added to the system to obtain increased image overlay capability. This method of providing any required number of bit planes (bits per pixel) is expensive and hardware dependent. Software portability between similar but not identical hardware designs for imaging is difficult and expensive.

2. Software Overlay Technique. In this prior art method, a temporary technique is sometimes used to overlay one image upon another, such as a cursor over a background image, and then to remove the cursor from the screen display. One method in which to remove the cursor requires re-display of the entire display without the cursor. This is necessary to avoid the "Pacman effect", i.e., a temporary shadow of the removed overlay. In another method, a copy is made of the pixel values that will be changed when the temporary image is displayed, so that the original pixel values can be restored from the copy upon removal of the overlay. This has been done without the use of additional hardware bit planes, but only on a very limited basis.

In the field of computer graphics, the use of color is important, not only for its enhanced clarity but also to distinguish data in one overlay plane from another. Hue and opacity may be used to give "trueness" to a color and to create a visual sense of transparency. This capability in the art has been achieved primarily by hardware design wherein hue or opacity is varied by the use of an RGB display of primary colors with at least 8 bits per color, therefore, such systems require a minimum of 24 bits per pixel in order to create such true color capability. An example would be the Silicon Graphics, Inc., Iris™ computer system for true color which has 64 bits per pixel. This capability of true color has not been a developed feature of software imaging display programs.

SUMMARY OF THE INVENTION
(DISCLOSURE OF THE INVENTION)

The present invention comprises a method and apparatus for managing two-dimensional or three-dimensional pixel image data permitting overlay of the pixel image data. The invention comprises:

a) initializing memory and data structures for storage and management of a changing subset of selected sets of pixel image data;

b) adding certain subsets of the selected sets of pixel image data to the data structures;

c) deleting certain subsets of the selected sets of pixel image data from the data structures; and d) accessing the data structures to provide an image display. A two-dimensional (priority) or a three-dimensional (transparency) application may be requested.

In the preferred embodiment, when initializing memory and the data structures, the number of bits required for overlay status information (priorities, z-buffering and shading information) and for pixel header and value nodes are determined, as well as determining the number, priority, and pixel values of commonly used overlays. A certain data structure is initialized indicating pixels which display values have changed since a last display request. Linked lists of pixel value nodes and free lists of pixel value nodes are also initialized. In initializing the linked lists, a pixel header node for each linked list is initialized, including a pointer therein to the first node in the linked list. The header may alternatively contain a prioritized bit field for indication of extant common overlays. In initializing the free lists, pixel value nodes are initialized and inserted into the corresponding free list. In the pixel value nodes, pointers to the next node in a corresponding linked list are initialized, as well as fields for pixel values and overlay status information.

In the preferred embodiment, adding pixel image data to the data structures comprises adding image data independently for each pixel, for each selected set of pixel image data, to the data structures. A flag may be set within a common overlay field of the corresponding data structure or a pixel value entry may be placed in the data structure. For a two-dimensional application, the entries are ordered by priority. For a three-dimensional application, the entries are ordered by z-buffer. A flag is set within a data structure that specifies those pixels which display values have changed since the last display request.

In the preferred embodiment, deleting pixel image data from the data structures comprises deleting image data independently for each pixel, for each selected set of pixel image data, from the data structures. A flag may be unset within a common overlay field of the corresponding data structure or a pixel value entry maybe removed from the data structure. A flag is set within a data structure that specifies those pixels which display values have changed since the last display request.

In the preferred embodiment, accessing the data structures to provide an image display comprises accessing image data independently for each pixel, for a preselected subset of pixels, within the data structures. The subset may be those pixels having a flag set within the data structure that indicates those pixels which display values have changed since the last display request. For a three-dimensional (transparency) application, display values for the pixels are based upon a composite of pixel value entries in the data structure corresponding to the pixel. For a two-dimensional (priority) application, display values for the pixels are the pixel values of the highest priority pixel value entries in the corresponding data structures. The flags within the data structure that indicates pixels which display values have changed since the last display request are unset for the subset of pixels accessed during the current display request.

The apparatus of the invention may comprise firmware or programmable software. In the case of programmable software, the invention comprises a set of routines callable by software external to the invention. The external software passes commands and pixel image data to the invention. The invention returns pixel values for display, the display hardware being commanded by the external software. In the case of firmware, the invention comprises hardware embodying the method and programmable software of the invention. The hardware may be inserted within a computer or alternatively within display hardware. Where the firmware of the invention is inserted within display hardware, the invention commands the display hardware rather than external software.

A primary object of the invention is to permit dynamic image pixel management for composite image displays.

Another object of the invention is to free image display designs from strong hardware dependencies.

A further object of the invention is to permit graphics display of complex overlayed images in real time.

An additional object of the invention is to permit true color composite images of transparent overlayed images.

A primary advantage of the invention is that it can be introduced into any graphics display environment without significantly altering software application programs.

A further advantage of the invention is that it simplifies hardware and software graphics display designs.

An additional advantage of the invention is that it reduces the cost of software development and the cost of hardware necessary for advanced display applications.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 13 is a block diagram of a preferred system useful in accordance with the invention.

FIG. 14 is a block diagram of the preferred hardware embodiment of the invention.

Figure 1:
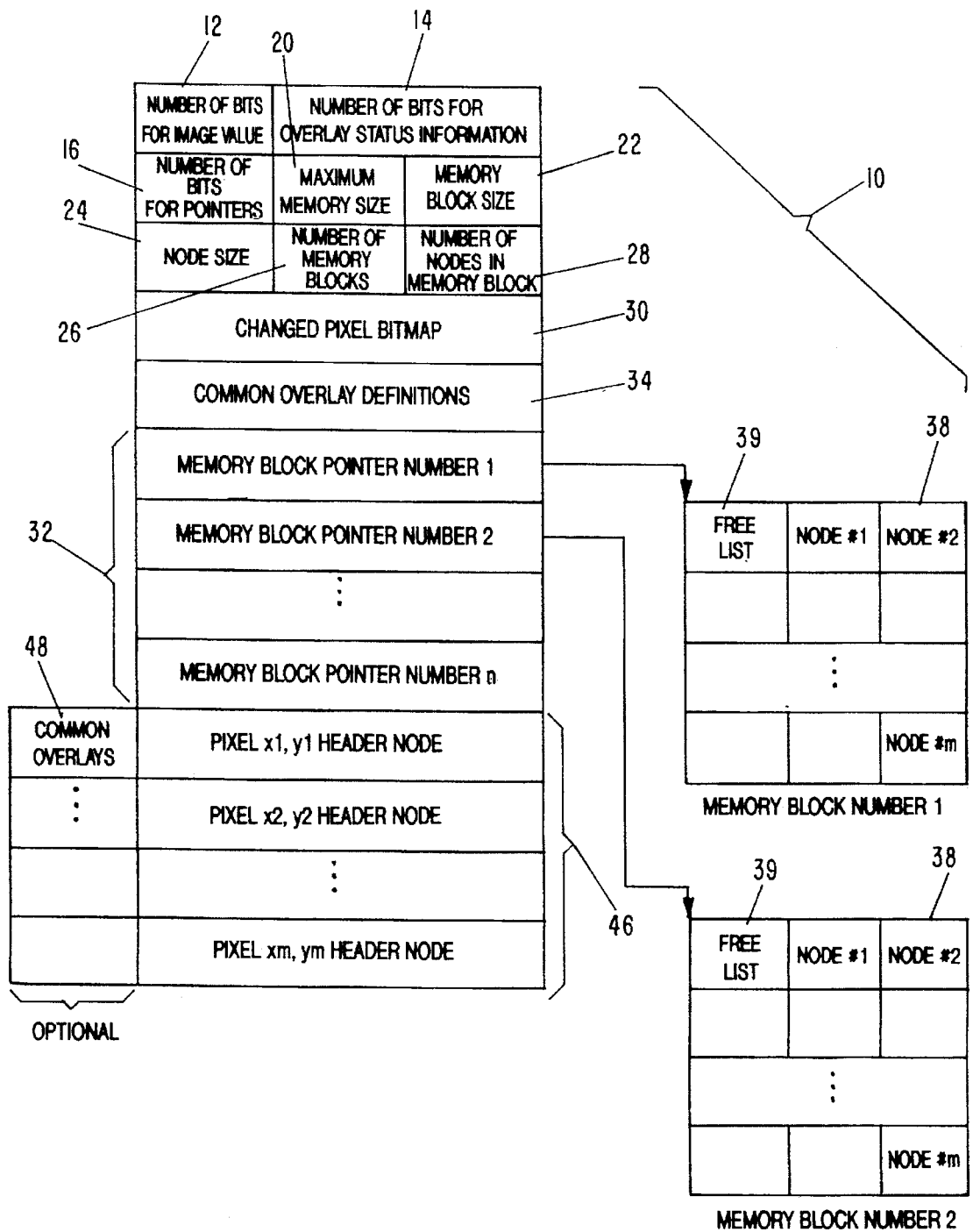
FIG. 1 illustrates the memory structure of the invention.

DESCRIPTION OF THE PREFERRED EMBODIMENTS (BEST MODES FOR CARRYING OUT THE INVENTION)

The overlay image data management apparatus and method of the present invention comprise hardware components and associated software, providing to existing display devices the ability to display complex overlayed images in real time. The invention is useful for all graphical purposes, for instance from the simple display of a cursor overlayed on an image to the display of a brain surgeon's probe within a three-dimensional representation of the brain.

With reference to the drawings, the preferred method of the invention (see FIG. 8), as also embodied in the apparatus of the invention, comprises the steps of initializing image data memory 200, receiving and storing binary image data and corresponding overlay status information (an "addition request") 300, deleting binary image data and corresponding overlay status information (a "deletion request") 500, and accessing display data (a "display request") 400, either the proper display values of all pixels of those changed since the last display request, or of a requested subset of all pixels.

Throughout the specification and claims, the following terms are defined as follows: "Overlay," for the purposes of the present invention, is defined to include both the attributes of priority and transparency in image presentation, such that the methods of overlay and transparency as commonly understood in the art are simulated by the present invention. "Overlay status information" is defined to comprise priority level, transparency, Z-buffer level and various shading models. Transparency, Z-buffer and shading are employed in the prior art of three-dimensional imaging, while priority is employed in the prior art of two-dimensional imaging. "Image value" means a color or gray-scale value for a pixel of an image. "Pixel display value" means the color (or gray scale value) for a pixel that is to be displayed on the display hardware based on the overlayed image values and overlay status information for that pixel. "Pixel" means a single pixel or any preselected base group or unit of multiple pixels, including two-dimensional and three-dimensional (voxel) representations. "Memory" or "internal memory" means the random access memory available to a central processing unit, whether real or virtual. "Linked list" and "pointer" have the meanings described in Chapter 4.1 of Ellis Horowitz & Sartaj Sahni, Fundamentals of Data Structures (Rockville, Md.; Computer Science Press; 1982). "Set" and "subset" have the meanings described in Chapter 1.2 of Harry R. Lewis & Christos H. Papadimitriou, Elements of the Theory of Computation (Englewood Cliffs, N.J.; Prentice-Hall; 1981). "Priority" is a user defined display indicator which determines what overlay will take precedence over another in a composite image. "Transparency" indicates opacity values which vary from completely transparent to completely opaque. "Z-buffering" specifies a value of depth in the three-dimensional mode. "Hardware display device" comprises devices known in the art as RGB display boards, imaging display boards, graphics display boards, graphics monitors and such imaging monitors or controller boards having similar capabilities.

Figure 4:
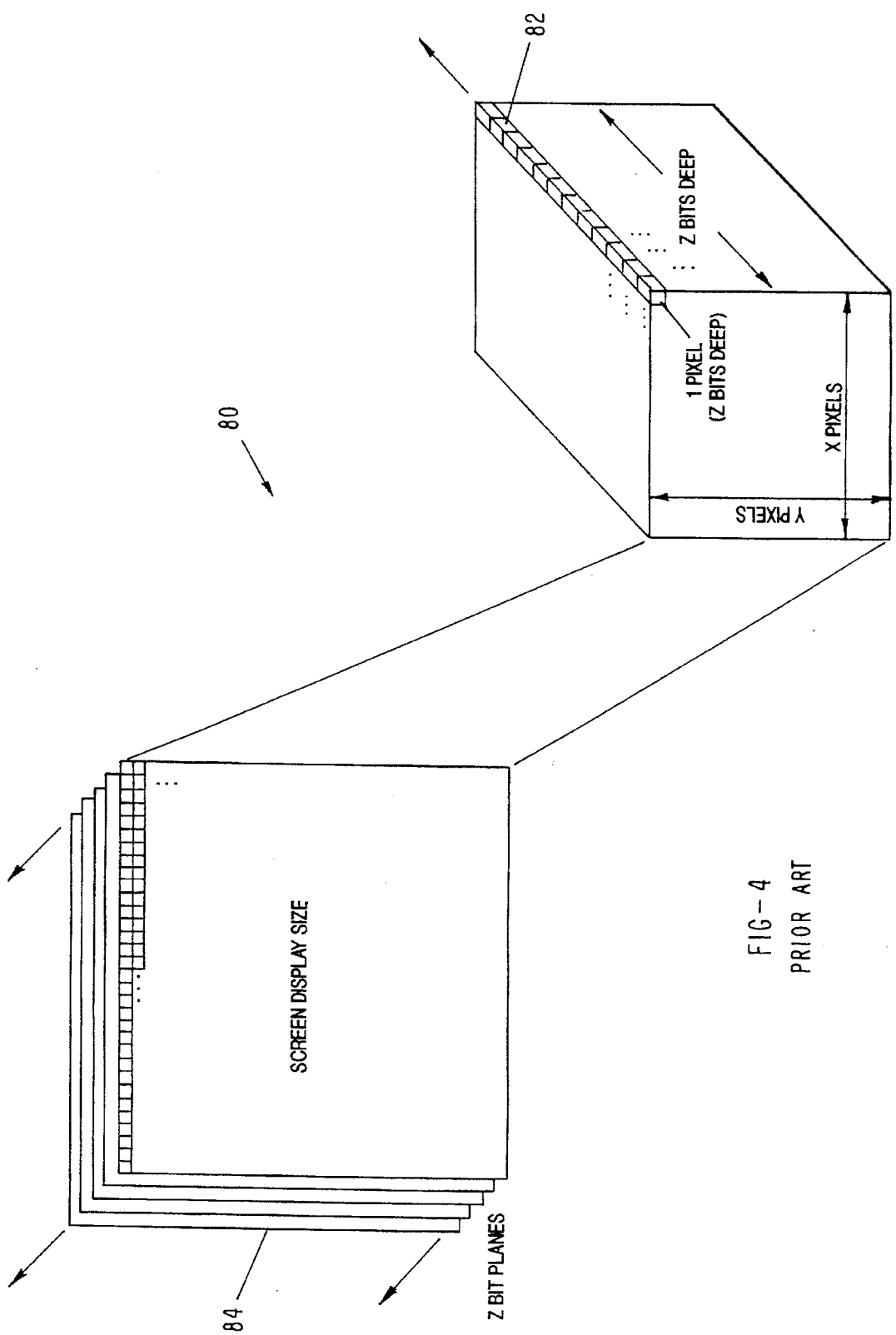
FIG. 4 illustrates a prior art implementation of bit planes in hardware.
Figure 5:
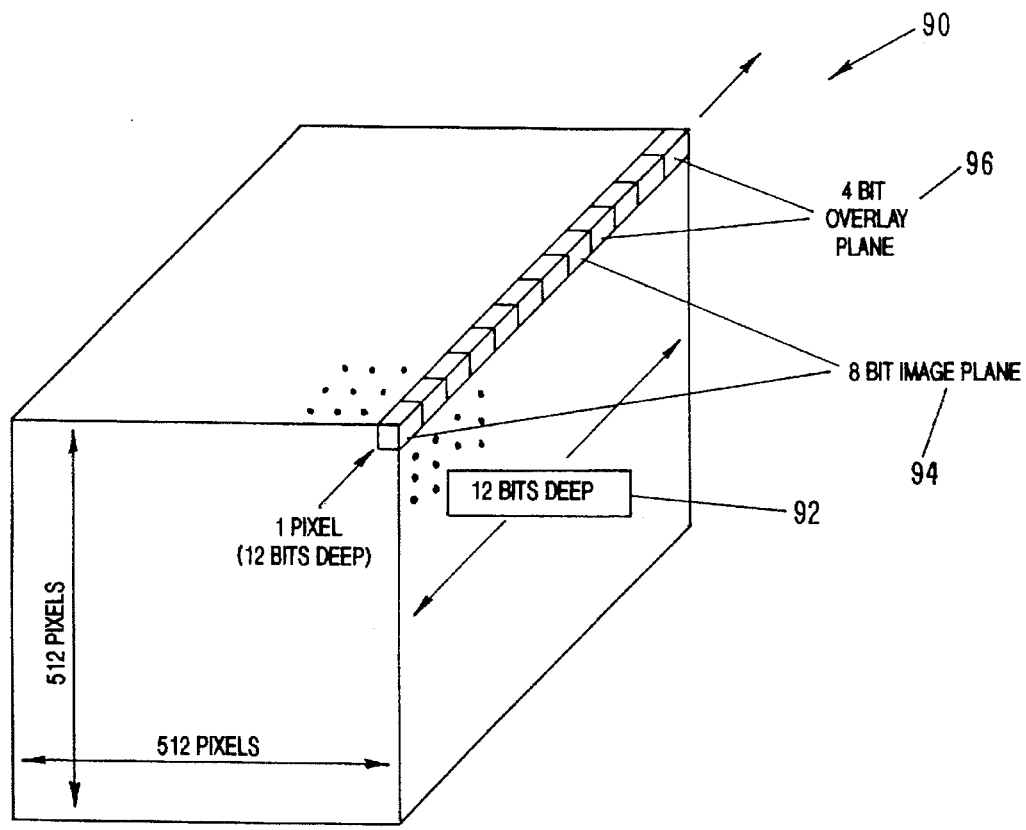
FIG. 5 illustrates a prior art implementation of overlays in hardware bit planes.
Figure 6:
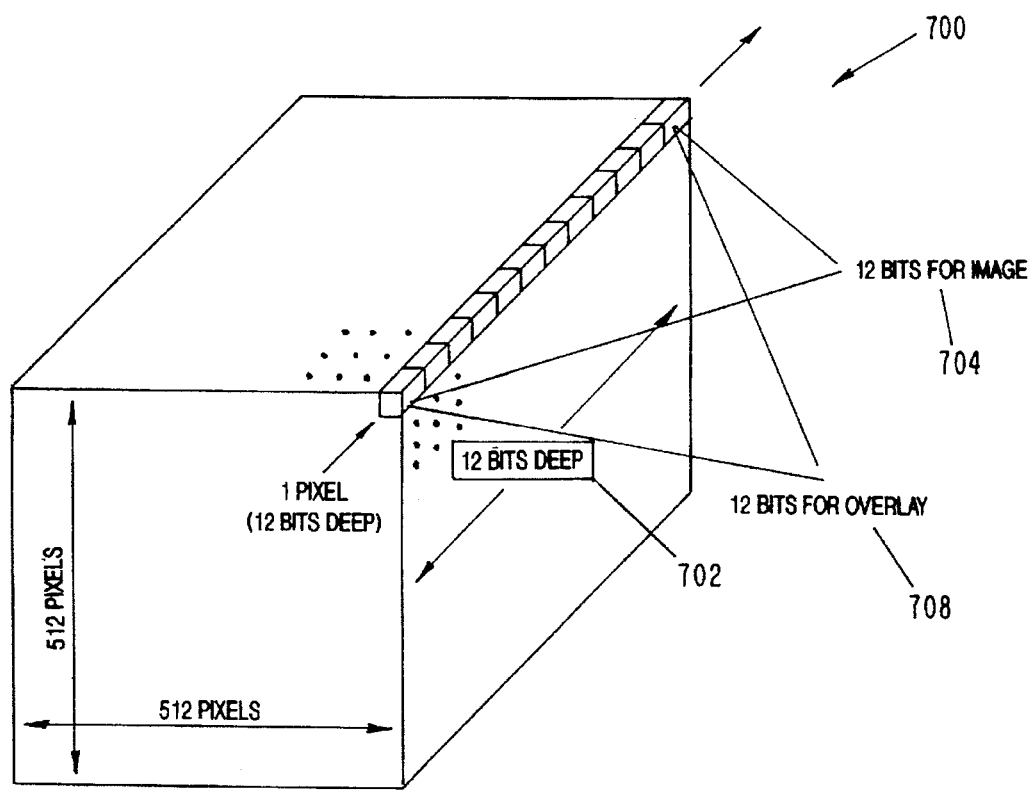
FIG. 6 illustrates an example of the use of the invention, wherein twelve hardware bit planes are used simultaneously for image display and image overlay.

An efficient software overlay management system must allow the display of the maximum number of colors or gray scales possible for an image (which is dependent on the display hardware) while still allowing the capabilities of overlays upon such an image to create composite images. In the prior art, as illustrated in FIG. 4, the number of overlay planes 84 possible in a hardware bit plane format 80 are determined by the number of bit planes 82 available in the hardware design, e.g., 8 bits. Also in the prior art, as illustrated in FIG. 5, a hardware implementation of overlays 90, wherein a certain number of hardware bit planes 94 have been designated to form a gray scale image, the number of overlays possible 96 upon such a gray scale image are determined by the number of hardware bit planes above the number of bit planes designated for the gray scale image. For example, if the display hardware 90 in use has 12 bits 92 per pixel available and gray-scaling is to use 8 bits 94 (256 gray scales), then only 4 bits 96 are available for overlays. These 4 bits 96 allow up to 16 independent overlays ($2^4$). In contrast, using the present invention (see FIG. 6), with 12 bit planes 702 available in hardware, it is possible to have both an image of 12 bits 704 ($2^{12}$ or 4096 gray scales) and 12 bit for overlays 708 ($2^{12}$ or 4096 overlays), as well as transparency and true color capabilities. This is achieved by an overlay management system which gives overlay status information (priority level or transparency, Z-buffer, and shading values) to all image values at any given pixel location of a composite image, such that the appropriate overlay, based on this overlay status information, is perceived by the viewer. In essence, the present invention constitutes a means of dynamic pixel management of all pixels available in any hardware bit plane format to allow for composite image displays.

Ideally, the design of an imaging overlay management system must be flexible enough to allow a varying number of bits per image pixel, priority levels as well as transparency and other image attributes, and should not be entirely dependent on any given type of display hardware bit plane design. It should function independently from the display hardware employed. It must receive data, transform it in a pre-defined manner, and then return the transformed data for display. In order for any system to function in this fashion when operating on different hardware configurations, information about the hardware configuration and the overlay capabilities desired must be provided to the overlay management system upon its initialization, including the number of pixels available for display, the number of overlays needed, and the amount of computer memory dedicated for use by the overlay management system.

Figure 7:
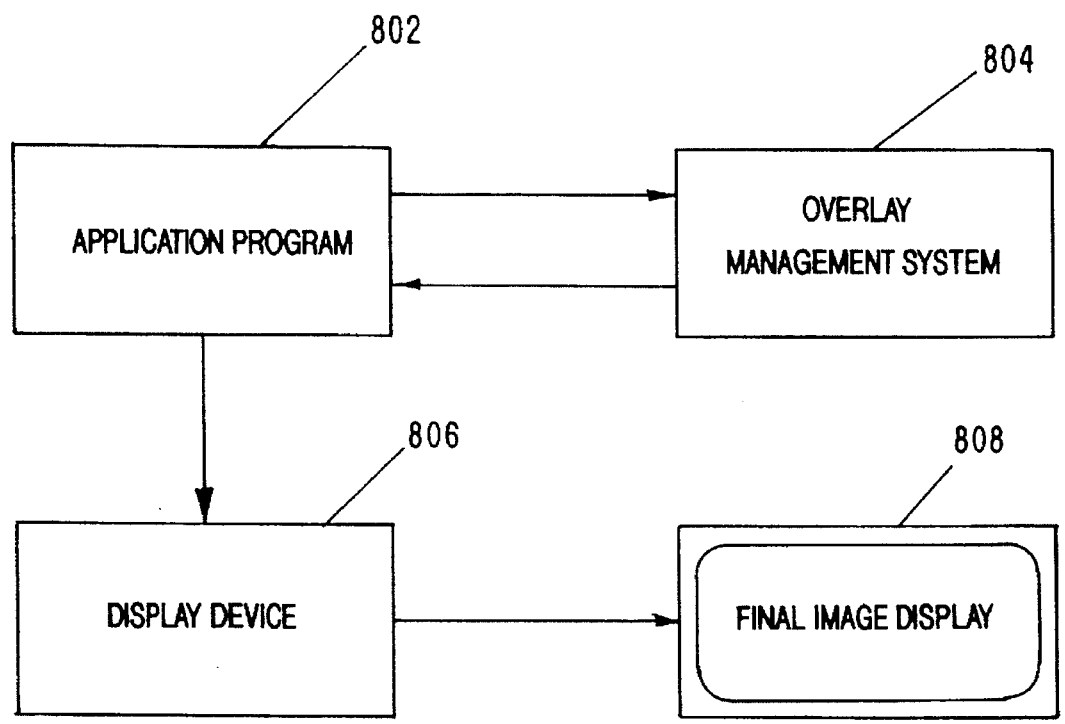
FIG. 7 is a block diagram of the preferred embodiment of the software interface of the present invention.

The present invention provides an apparatus and method permitting imaging overlay capabilities far greater than available under the prior art (see FIGS. 4 and 5), given the number of bits per pixel in any given hardware display device. The invention 804 (see FIG. 7) functioning independently of the display device 806 and the means of communication with an application program 802, governs the manner in which the display device will ultimately display images 808 such that the display device 806 is able to achieve a capacity for display which exceeds its original hardware configured display capabilities (compare FIG. 5 with FIG. 6) Such a design reduces the need for extended hardware redundancy to achieve increased imaging overlay capabilities.

Alternatively, as shown in FIG. 14, the method and apparatus of the invention may integrate the overlay management within display device 904, such that integrated device 904 communicates with application program 902 to display images 906. The advantage of this alternative is that the method of the invention may be embodied within firmware, speeding execution of the management and display of complex images.

Figure 2:
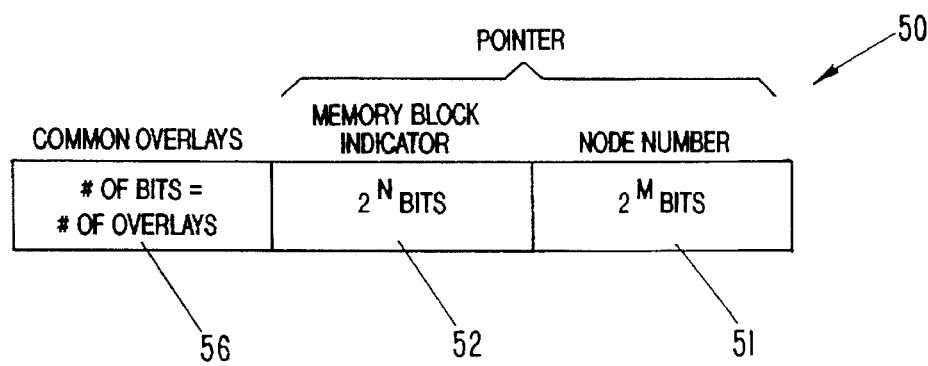
FIG. 2 illustrates the contents of the pixel header nodes of the invention.
Figure 3:
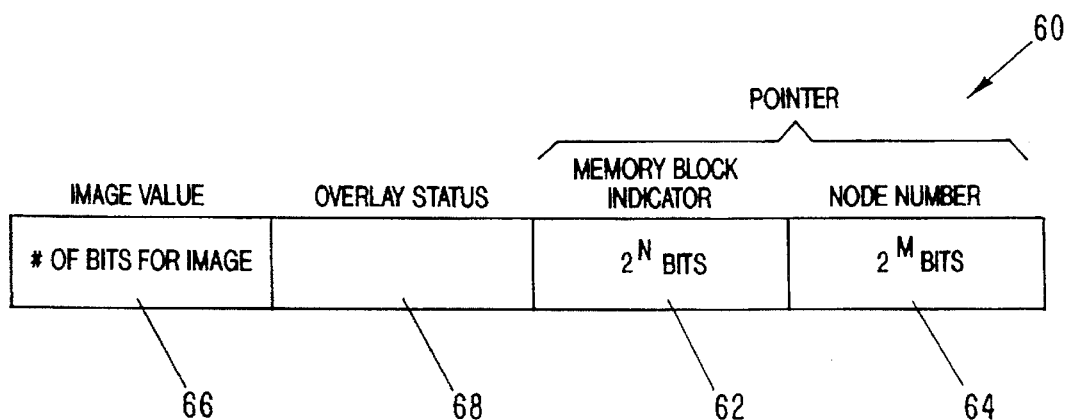
FIG. 3 illustrates the contents of the pixel value nodes of the invention.

As shown in FIGS. 2 and 3, the preferred apparatus and method of the invention (an overlay management system using dynamic image pixel management for composite image display) use dynamic, rather than static, data structures so that the use of memory is minimized while allowing flexibility according to the needs of the user or application program. The data structures of the present invention comprise linked lists of pixel value nodes 60 which will contain all images overlayed on any particular pixel location. The head of each linked list comprises a pixel header node 50. The number of bits in (i.e., the size of) each pixel value node 60 is set according to the hardware available and the capabilities desired, for example, whether priorities or transparencies and other imaging attributes are desired. This information is provided as initialization input (FIG. 9) 204 to the overlay management system. The size of the maximum memory available for use and the memory block size also determines the size of the linked list nodes. As an example, if the maximum memory specified on initialization is to be 5 megabytes, the memory block size is to be 65,536 bits, the image displayed by hardware is to be 512×512 pixels, 8 bits per pixel, and up to 256 overlays are possible, then the node size for pixel values is 44 bits, the size of the pointer component of each node is 20 bits (9 bits for the memory block indicator 62 and 11 bits for the node number 64 within that memory block), leaving 24 bits to contain the image value 66 of 8 bits and overlay status information 68 of 16 bits; and the pixel header nodes 50 will consume, assuming 4 common overlay bits 56 are desired, 786,432 bytes (one node per pixel and 3 bytes (or 24 bits) per header node, comprising 9 bits for memory block indicator 52, 11 bits for node number 54 and 4 bits for common overlay 56). Therefore, 745,472 pixel value nodes could be accessed (5 megabytes less 786,432 bytes for the pixel header nodes, divided by pixel value node size of 44 bits). This would allow 4 common overlays as well as approximately 3 pixel value nodes per pixel. Each pixel value node 60 is structured, for example, as in FIG. 3, and each pixel header node 50 as in FIG. 2.

For a two-dimensional (2-D) application of the invention (where priorities are being used), it is beneficial to allow pre-defined overlay colors (with corresponding priorities) which can be entered by the user at system initialization by input. These constitute "common overlays" which can be turned on by setting the appropriate common overlay bits 56 within each pixel header node 50 for those pixels to be overlayed. The order of listing of the bits indicates the order of priority of the common overlays, the highest priority being for the overlay corresponding to the first bit encountered. Such overlays may be pre-defined for commonly used overlays to save time in the access of some of the pixel display values (because such overlays would have highest priority and would be immediately accessible), freeing pixel value nodes 60 for other overlays.

The size of memory as well as the access time for any given data must be kept to a minimum. For these reasons, it is beneficial to generate and retain certain global status information on initialization of the memory structure 10, as shown in FIG. 1, in addition to the array of pixel header nodes 46 and, optionally, common overlay bits 48. As illustrated in FIG. 1, such global status information comprises:

a) size of each field of a pixel value node:
        (1) number of bits for image value 12;
        (2) number of bits for overlay status information 14; and
        (3) number of bits for linked list pointers 16;
    b) node size 24 of each pixel value node;
    c) maximum number of memory blocks 26 (determined by the maximum memory size 20 entered by the user divided by the memory block size 22 entered by the user);
    d) number of pixel value nodes in each memory block 28 (determined by the memory block size 22 divided by the pixel value node size 24);
    e) changed pixel bitmap 30 discussed below;
    f) common overlay definitions 34, comprising:
        (1) whether common overlays are extant;
        (2) how many; and
        (3) for each, color value and priority; and
    g) an array of system (memory block) pointers 32 to each block 38 in use.

Because the determination of a pixel display value is dependent on either the highest priority overlay (for a 2-D application), or a Z-buffering and/or shading model order (for a three-dimensional (3-D) application), it is necessary for pixel value nodes (FIG. 3) 60 to be placed on the corresponding pixel's linked list in a given sequential order. The sequential order for placement on the lists is as follows:

a) for a priority application:
        (1) if a common overlay, set the appropriate common overlay bit (FIG. 2) 56 in the pixel header node 50 (these bits are already in order of priority);
        (2) the initial image data is in the first node; and
        (3) all other pixel value nodes follow in highest to lowest priority; and
    b) for a transparency application, from closest to farthest Z-buffer (or varying shading model) values.

Figure 11:
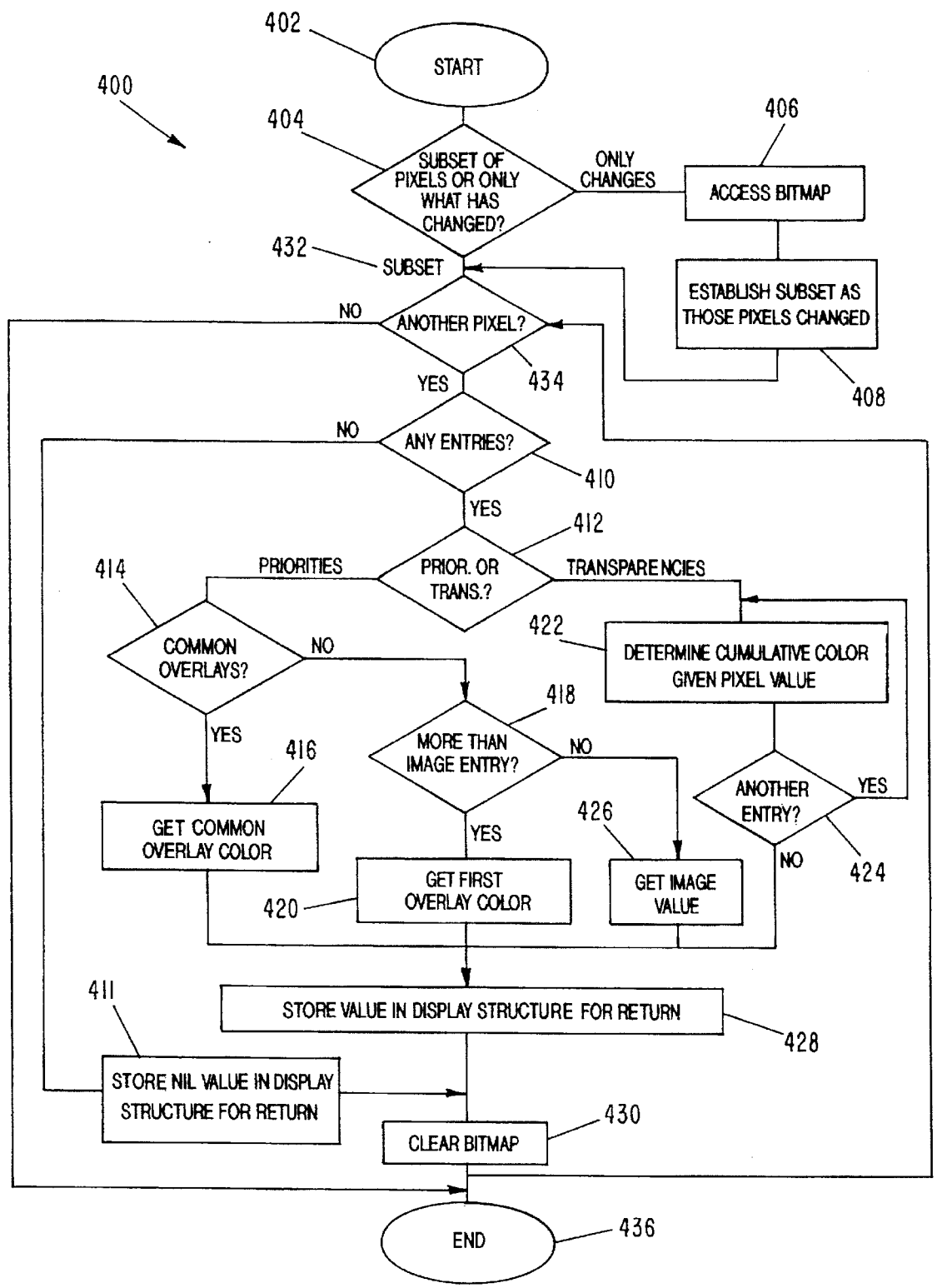
FIG. 11 is a flowchart representing the display request step of the invention.

Display processing time is minimized by use of a bitmap 30 (see FIG. 1) of the pixels which have been changed since the last display request. As shown in FIG. 11, only the pixels which must be redrawn because they have been modified are accessed 406 on a display request 400 for changed pixels and therefore the display of a new image after addition or deletion of overlays is quickened. For example, this bitmap 30 would require 32,768 bytes of memory for an image of 512×512 pixels.

Memory must be managed efficiently in an embodiment of the method of the invention. Because system pointers are normally quite large (32 bits to 64 bits), host system memory will be allocated in blocks of a user-defined size, up to a user-defined maximum memory size, from which memory will be allocated using a memory management method for the pixel value nodes of the linked lists. In this method, pointer values given in each node to the next link can be made as small as possible yet still access the maximum amount of memory available.

To keep the memory management simple and the insertion/deletion and access time to a minimum, each pixel value node is the same size. This eliminates the need for rearrangement of allocated memory into contiguous blocks ("garbage collection") or consolidation of memory. A free list of available nodes 39 is kept within each memory block (see FIG. 1) 38 so that an empty node can be quickly found and added to the appropriate linked list of pixel value nodes. As nodes are removed from a linked list, they are returned to the free list for reuse. A method for management of free lists is disclosed by Horowitz & Sahni, supra, at Chapter 4.3. Alternatively, the free list may be a bitmap within each memory block. The bitmap would specify which pixel value nodes are free and which are in use.

For a 3-D application (where transparency is to be used), a method of color mapping is used to determine the best pixel display value given the pixel values which map to any given pixel location. To determine the color to be displayed for a particular pixel, the following method is used:

For each linked list entry for a given pixel location:

Pixel Value=Color * Opacity Value * Z-buffer (or other shading factor)

where:

Color=1 to $2^n$
    (wherein n is the number of bits per pixel);

Opacity Value=0 to 1 (varying between 0 (transparent) and 1 (opaque) according to the users specifications);

Z-buffer=value of three-dimensional depth of image; and

Shading factor=value of intensity model used.

Determination of the cumulative color (see FIG. 11) 422 occurs as follows: The pixel value of the first entry in the linked list is temporarily considered as the cumulative color. A color mapping is performed between the temporary cumulative color and the pixel value of the next entry in the list. The mapping process is repeated 424 until the final pixel value node in the pixel's linked list has been accessed. The final cumulative color is then stored in the display structure 428 for return to the application program.

The apparatus and method of the invention are separate from any given application program and display device (FIG. 7) and are therefore accessed by commands 104 (see FIG. 8) to the overlay management system. These commands will initiate the performance of varied tasks of the invention, including initialization of the memory structure 200 (see FIG. 9), addition of images 300 (see FIG. 10), deletion of images 500 (see FIG. 12), and access of pixel data 400 (see FIG. 11).

The varied tasks of the invention can process either a single pixel or a structure of pixels. In most instances in the addition of an image overlay, the application program will determine all pixels in which the image is to be displayed. Therefore, it is more efficient to perform the addition request (FIG. 10) 300 given the complete structure of pixels than one pixel per request. The same is true for the above noted deletion of images and access of pixel data commands.

Figure 8:
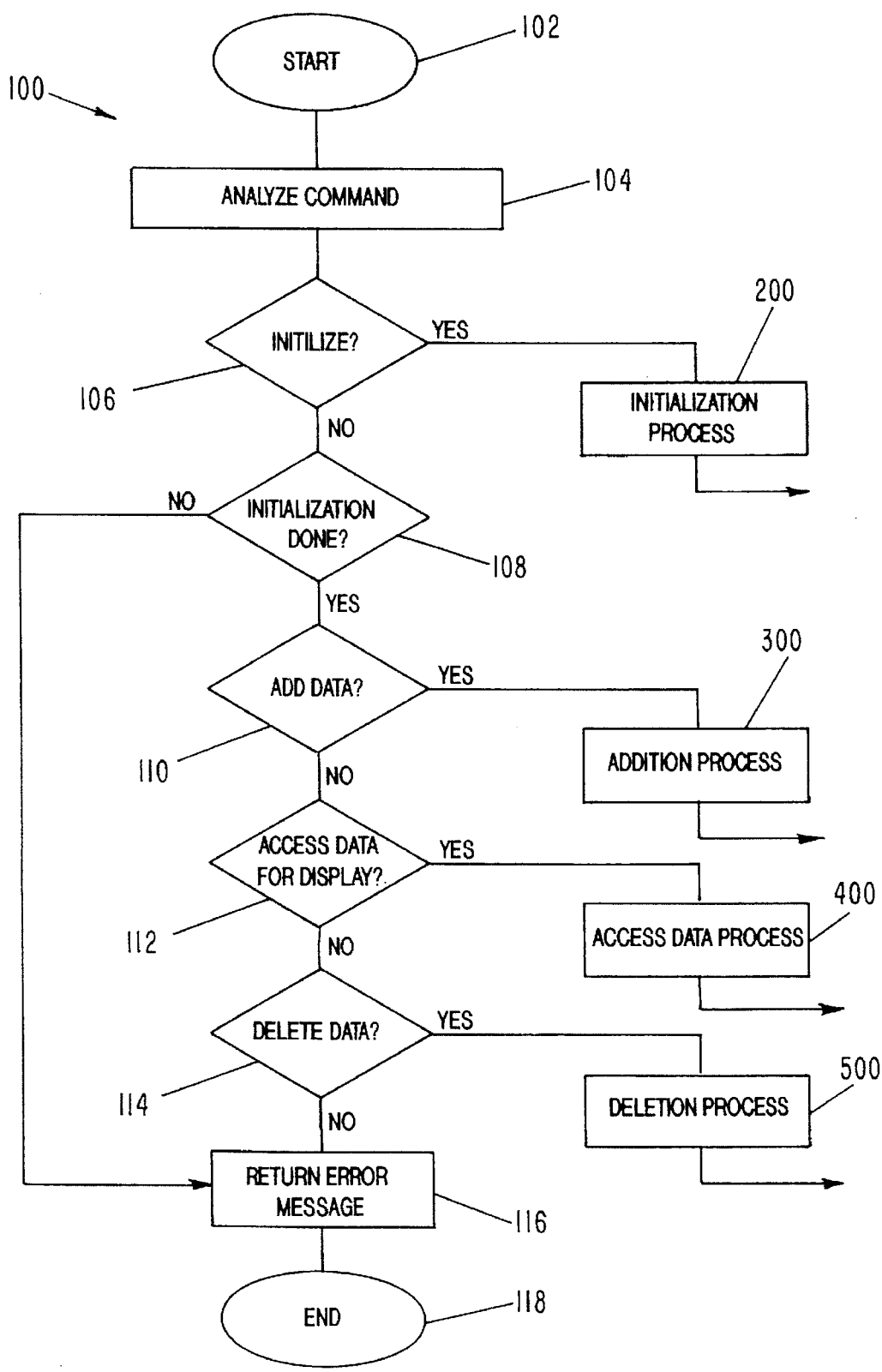
FIG. 8 is a flowchart representing the method of the invention at the highest level of hierarchy.

FIG. 8 illustrates the overall process 100 of the invention at the highest level of hierarchy. When the overlay management system receives a command 102, it analyzes the command 104. If the command is for initialization 106, then the initialization process 200 (see also FIG. 9) is executed. If it is another type of command but initialization has failed or not occurred 108, then the process returns an error message 116, and ends 118. Otherwise, if the command is to add data 110, then the addition process 300 (see also FIG. 10) is executed. If the command is to access data for display 112, then the data access process 400 (see also FIG. 11) is executed. If the command is to delete data 114, then the deletion process 500 (see also FIG. 12) is executed. If the command is not one of the above, an error message is returned 116, and the process ended 118.

Figure 9:
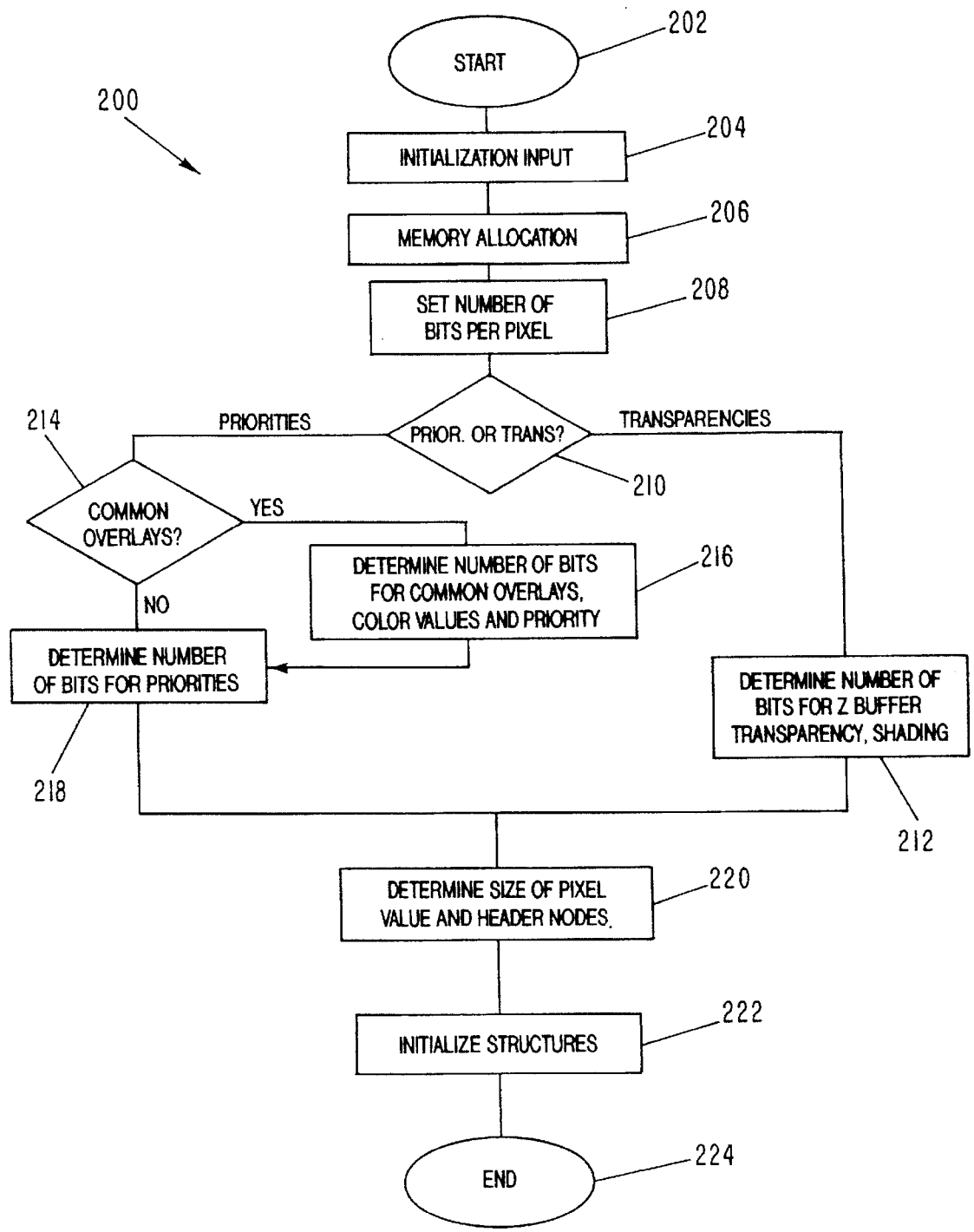
FIG. 9 is a flowchart representing the initialization step of the invention.

FIG. 9 illustrates the memory initialization process 200 of the invention. On receipt of an initialization command 202, initialization input 204 on the user's requirements is requested and received. Such information includes the requested amount of memory to be allocated, the available number of hardware bits per pixel (dependent on the hardware display device) and the overlay status parameters. The requested amount of memory is allocated 206. The number of bits per pixel is set 208. The system then determines whether the user requested priority (2-D) or transparency (3-D) capability 210. If it was priority, and if the user also requested common overlays 214, then the number of bits needed for common overlays in each pixel header node is determined, as well as the color values and priorities for the common overlays 216. If the user has specified priorities, then the number of bits for priorities in the overlay status fields of the pixel value nodes is determined 218. If the user has instead specified transparencies, then the number of bits for transparency, Z-buffering and any shading information in the overlay status fields of the pixel value nodes is determined 212. Finally, the size of the pixel value and pixel header nodes is determined 220, the memory structure 10 (illustrated in FIG. 1) is established 222, and the process is ended 224.

Figure 10:
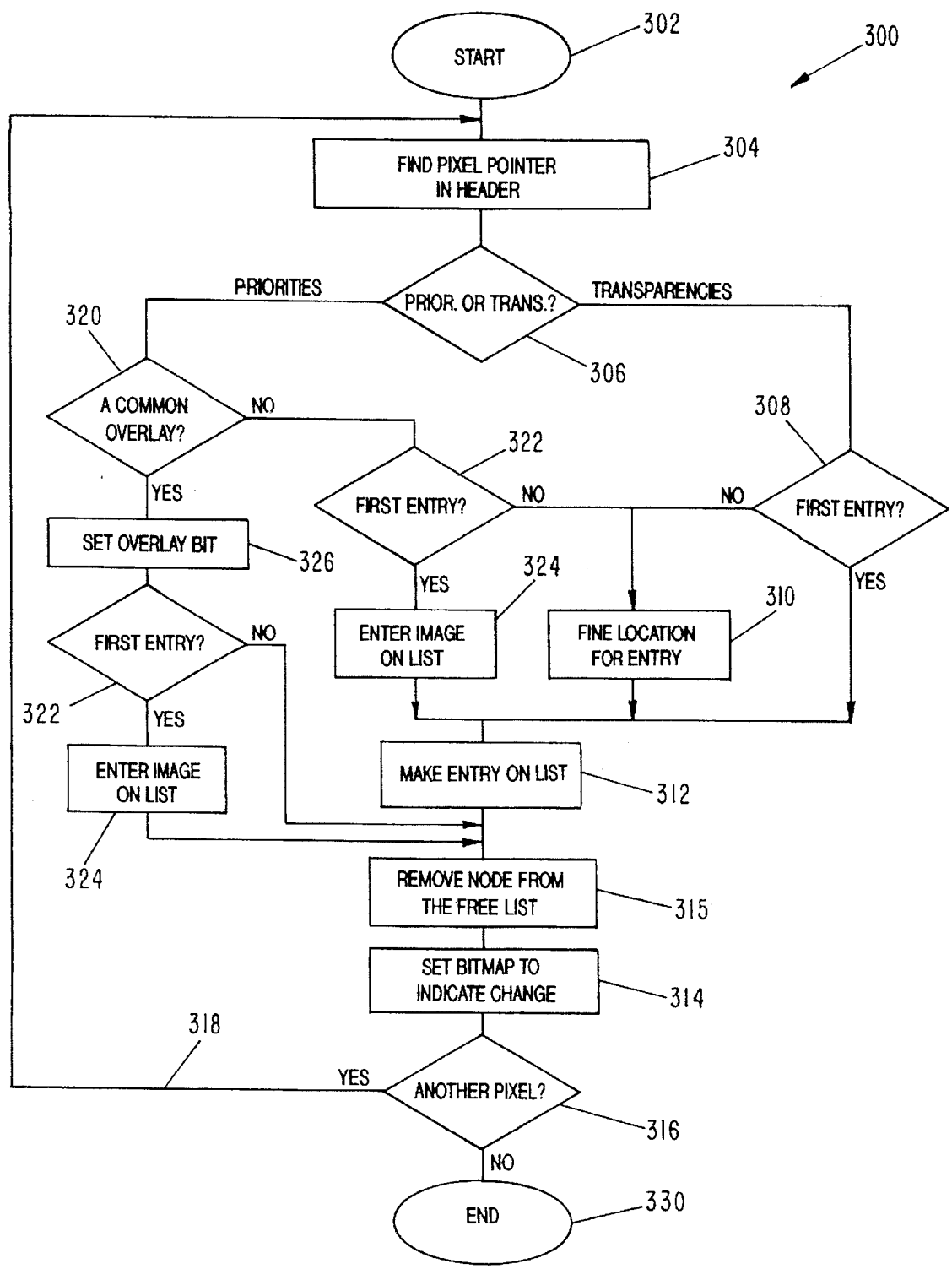
FIG. 10 is a flowchart representing the addition request step of the invention.

FIG. 10 illustrates the addition request process 300 of the invention. On beginning the request 302, the pixel header node for the first pixel of the image to be added is located 304. It is then established whether the imaging mode is set for priority or transparency 306. If the data is for a priority overlay and is a common overlay 320, the appropriate overlay bit located within the pixel header node is set 326 to 1 by "OR"ing the common overlay structure with the appropriate priority mask. For common overlays or otherwise, if the data to be added is the first entry 322 of any kind for that pixel, then any overlayed image for that pixel must be entered 324 as the first pixel value node on the pixel's linked list. For data other than common overlays, if the data is not the first entry on the list, then its location in regards to its priority value is determined 310 and a node is entered 312 to the list in the location determined. If the added image data is for a transparent image, then its location in regards to its Z-buffer is determined 310 (unless it is the first entry for the pixel 308) and a pixel value node is entered 312 to the pixel's linked list. In all cases, if one or two pixel value nodes have been entered to the pixel's linked list, those nodes are removed from the free list 315. In all cases, the corresponding bit for the given pixel is set in the bitmap 314 indicating a display change for that pixel location. If more than one pixel is to be changed 316, then the process is repeated 318 until none remain, in which case the addition process is ended 330.

For any 2-D application (where priorities are being used instead of transparencies), at the time the first overlay is entered for any given pixel, there could be a maximum entry of two nodes. The first node being for the overlayed image pixel 324 itself so that it can be restored at a later date when all overlays are removed, and the second node for the overlay 312 being added (only if it does not constitute a common overlay 320).

FIG. 11 illustrates the display request process 400 of the invention. Access of the method of the invention for a display request can be done for a single pixel, a given structure of pixels, all pixels, or only those pixels which have been changed since the last display access. For priority entries, the highest priority is the color value which is displayed. When using common overlays (FIG. 1) 48, these will always be of a higher priority than any entries on the list structure and therefore access to the display data is immediate without having to perform any list traversal. This overlay management sequencing reduces computer processing time and thereby improves the efficiency of the overlay management system.

On receipt of a display request 402, the system determines whether the command is for pixels, the values of which have changed since the last request, or for a subset of pixels (anywhere from one pixel to all pixels) 404. If the command is for changed pixels, then the bitmap of changed pixels is accessed 406 and the subset of these changed pixels (the determined values of which shall be subsequently returned) is established 408 to correspond to the bitmap. A loop 434 is then executed for each pixel in the subset 432, after which the process is ended 436. The loop comprises the following steps: The system determines for the current pixel whether any entries are on its linked list 410. If not, a nill color value is stored 411 for that pixel in the display structure for return to the application program. If an entry exists on the linked list, then the process determines if priorities or transparencies are in use 412. If priorities, then the process determines if a common overlay exists for the pixel 414, and if so determines the proper color 416. If no common overlay exists for the pixel, and if only a single entry exists on the pixel's linked list 418, then the color stored in that entry is accessed 426. If more than one entry exists, the process accesses the color stored in the first overlay 420 (the second entry in the linked list). If transparencies are being employed, then the process determines the cumulative color for the pixel 422 based on each linked list entry 424. Whether priority or transparency, the color value determined is stored in the display structure for return 428. Regardless of whether entries exist in the pixel's linked list, the bitmap of changed pixels is cleared for the current pixel 430.

Figure 12:
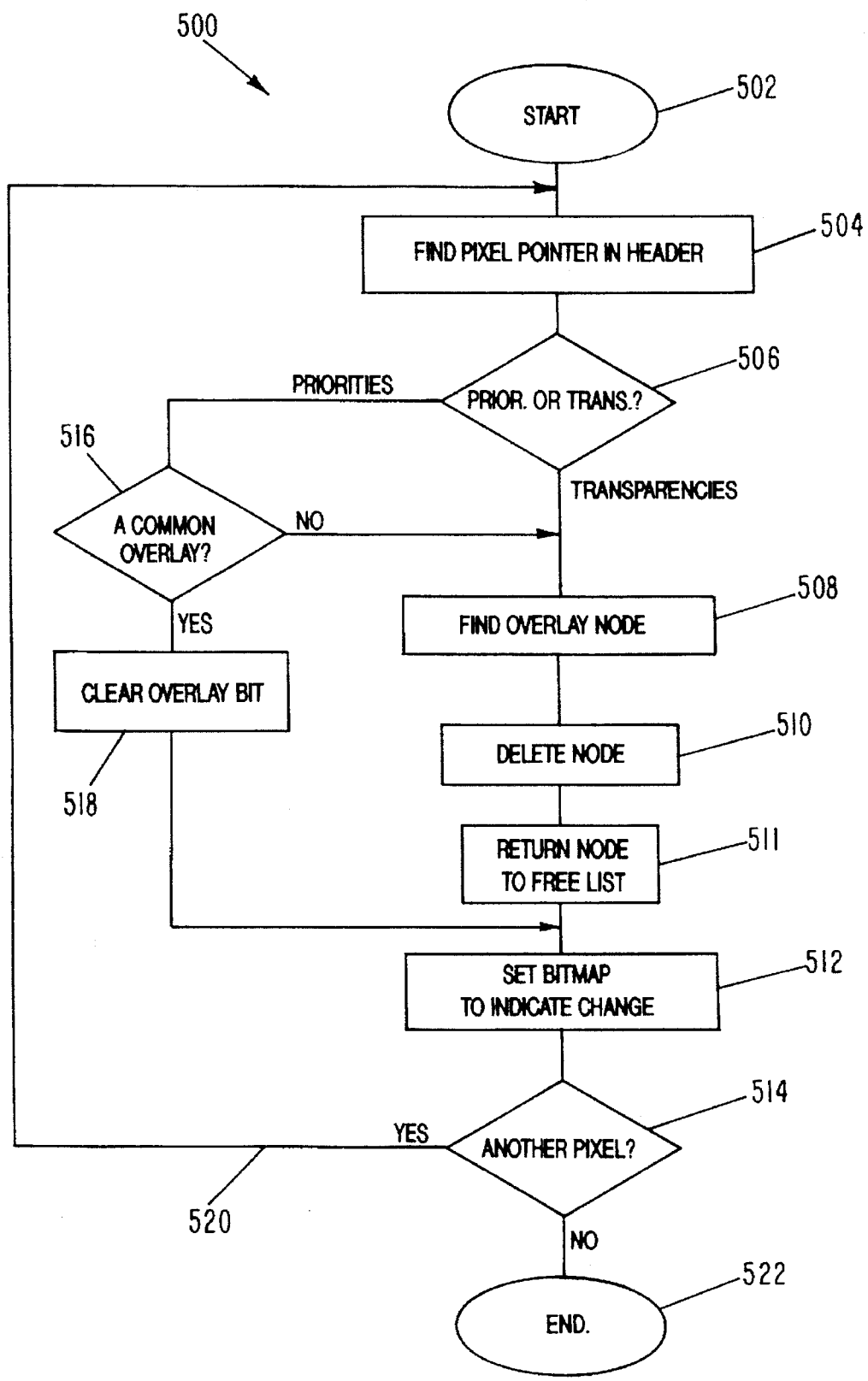
FIG. 12 is a flowchart representing the deletion request step of the invention.

FIG. 12 illustrates the deletion request process 500 of the invention. When a deletion is requested, the process is essentially the opposite of the addition process. On receipt of a request 502, the pixel header node is located 504 for the first pixel in the image to be deleted. If the image is a priority 506, and is a common overlay 516, then the appropriate overlay bit is cleared 518 to zero by "AND"ing the common overlay field of the pixel header node with the appropriate mask. If the image is not a common overlay, the pixel value node corresponding to the image is located 508 and deleted 510 from the linked list at which time the node is returned to the free list 511. In all cases, the corresponding bit for the given pixel is set in the bitmap 512 indicating a display change for that pixel location. If more than one pixel is to be changed 514, then the process is repeated 520 until none remain, in which case the deletion process is ended 522.

FIG. 13 illustrates the preferred embodiment of the apparatus 600 of the invention, which provides means for executing the method of the invention to display complex overlayed images. A plurality of central processing units 602 is connected by means of a plurality of buses 612 to random access memory 604, a plurality of data entry devices (such as keyboards and cursor control devices) 606, a plurality of hardware (visual) display devices (such as color monitors) 608, none or more computers 614, and a plurality of external storage devices (such as hard disk drives, optical disk drives, and scanners) 610. Software effecting the method of the invention and the memory structures of FIG. 1 are stored in random access memory 604. The application program in use by a user may also be stored in random access memory 604, or may be resident on one or more computers 614. The user may enter initialization input to the invention by means of data entry devices 606. The data returned by the method and apparatus of the invention is displayed on the plurality of display devices 608.

Figure 15:
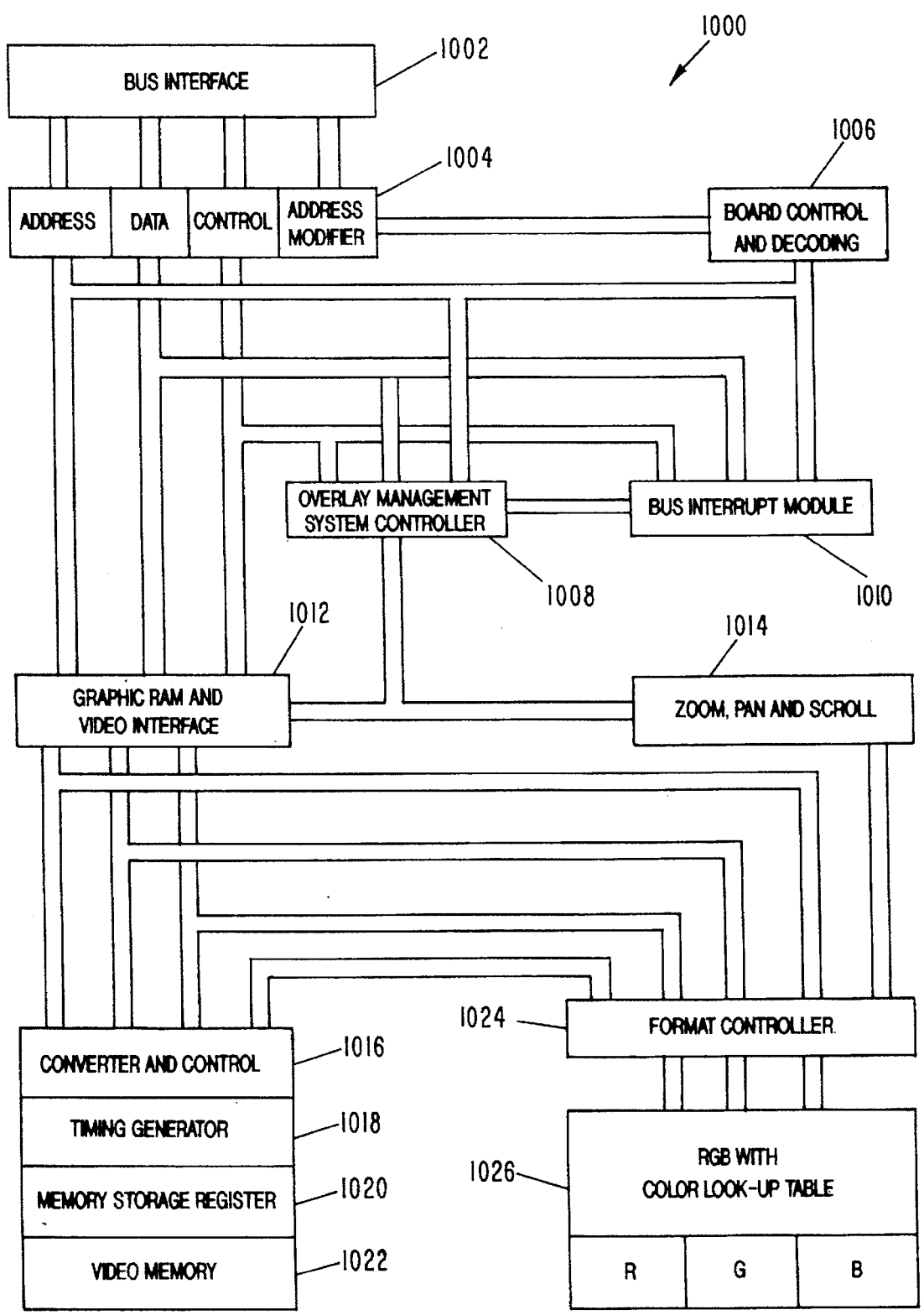
FIG. 15 is a block schematic of the preferred hardware embodiment of the invention.

The drawbacks encountered in a software embodiment of the present invention are: the invention performs an intermediary step before calling the actual display system which may slow down the display process at times where the display would normally be quite fast and the amount of memory needed for some applications is large, especially when performing 3-D imaging. These drawbacks can be solved by a hardware embodiment, for example, where random access memory 604, an appropriate central processing unit 602, and a hardware display device 608 (e.g., having red-green-blue (RGB) display capabilities) are combined into a single hardware "card" which would perform both the overlay management capabilities and the hardware display capabilities. A hardware embodiment comprises, for example microprocessor controlled gate arrays, which includes the software configuration of the overlay management system in such a hardware form as in FIG. 15.

The preferred hardware embodiment 1000 of the present invention comprises a bus interface 1002 which is linked to address, data, control and address modifier modules 1004. Such modules 1004 are governed by linkage to a board control and decoding module 1006 and a graphics random access memory (RAM) and video interface 1012. The latter module is linked to both a zoom, pan and scroll module 1014 and an array of modules governing the converter and control 1016, timing generator 1018, memory storage register 1020 and video memory 1022. Appropriate linkages are connected to an image format controller 1024 and a red-green-blue (RGB) output video display module with color look-up tables 1026. In this design, the overlay management controller 1008 and bus interrupt module 1010 are positioned to govern the activities of the graphics random access memory (RAM) and video interface 1012 for ultimate control of video imaging and graphics display as in the software embodiment of the current invention.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A method of managing pixel image data, the method comprising the steps of:
   a) initializing linked list data structures in memory for storage and management of a changing subset of selected sets of pixel image data, wherein each of the selected sets represents an object to be displayed on a display screen, wherein non-header and non-free nodes of the data structures contain pixel image data corresponding to a single pixel on the display screen;
   b) adding certain subsets of the selected sets of pixel image data to the data structures;
   c) deleting certain subsets of the selected sets of pixel image data from the data structures;
   d) accessing the data structures to provide an image display on the display screen; and
   e) to alter an individual pixel of a representation of an object to be displayed, altering a single non-header and non-free node of the data structures and redisplaying a single pixel of the display screen.

2. The method of claim 1 wherein the step of initializing data structures comprises determining whether a two-dimensional (priority) or three-dimensional (transparency) application is requested.

3. The method of claim 1 wherein the step of initializing data structures comprises determining a number of bits required for overlay status information.

4. The method of claim 3 wherein the step of determining the number of bits required for overlay status information comprises determining the number of bits to be used for priorities, z-buffering and shading information.

5. The method of claim 1 wherein the step of initializing data structures comprises determining a number of bits required for pixel value nodes and for pixel header nodes, wherein each pixel header node is a first node in a linked list.

6. The method of claim 1 wherein the step of initializing data structures comprises determining a number, priority, and pixel values of commonly used overlays.

7. The method of claim 1 wherein the step of initializing data structures comprises initializing a data structure indicating pixels which display values have changed since a last display request.

8. The method of claim 1 wherein the step of initializing data structures comprises initializing pixel header nodes to linked lists of pixel value nodes.

9. The method of claim 8 wherein the step of initializing the pixel header nodes comprises initializing a pointer to a first pixel value node in a linked list.

10. The method of claim 8 wherein the step of initializing the pixel header nodes comprises initializing prioritized bit fields for indication of extant commonly used overlays.

11. The method of claim 1 wherein the step of initializing data structures comprises initializing free lists of pixel value nodes, wherein each free list comprises free nodes, wherein each free node is available for incorporation into a data structure corresponding to an object to be displayed on the display screen.

12. The method of claim 11 wherein the step of initializing the free lists of pixel value nodes comprises the steps of:
   a) initializing pixel value nodes; and
   b) inserting each pixel value node within a free list within a same memory block.

13. The method of claim 12 wherein the step of initializing the pixel value nodes comprises initializing pointers to a next pixel value node in a corresponding linked list of pixel value nodes.

14. The method of claim 12 wherein the step of initializing the pixel value nodes comprises initializing overlay status fields.

15. The method of claim 12 wherein the step of initializing the pixel value nodes comprises initializing image value fields.

16. The method of claim 1 wherein the step of adding certain subsets of the selected sets of pixel image data to the data structures comprises adding image data independently for each pixel, from each selected set of pixel image data, to the data structures.

17. The method of claim 16 wherein the step of adding image data independently for each pixel comprises setting a flag within a commonly used overlay field within corresponding data structures.

18. The method of claim 16 wherein the step of adding image data independently for each pixel comprises ordering entries in the data structures by priority of the sets of pixel image data.

19. The method of claim 16 wherein the step of adding image data independently for each pixel comprises ordering entries in the data structures by z-buffer position of the sets of pixel image data.

20. The method of claim 1 wherein the step of adding certain subsets of the selected sets of pixel image data to the data structures comprises setting flags within a certain data structure, specifying pixels which display values have changed, thereby indicating pixels which display values have changed since a last display request.

21. The method of claim 1 wherein the step of deleting certain subsets of the selected sets of pixel image data from the data structures comprises deleting image data independently for each pixel, from each selected set of pixel image data, from the data structures.

22. The method of claim 21 wherein the step of deleting image data independently for each pixel comprises unsetting a flag within a commonly used overlay field within corresponding data structures.

23. The method of claim 1 wherein the step of deleting certain subsets of the selected sets of pixel image data from the data structures comprises setting flags within a certain data structure, specifying pixels which display values have changed, thereby indicating pixels which display values have changed since a last display request.

24. The method of claim 1 wherein the step of accessing the data structures to provide an image display comprises accessing image data independently for each pixel, from a preselected subset of pixels, within the data structures.

25. The method of claim 24 wherein, prior to the step of accessing image data independently, the method further comprises the step of establishing the subset of pixels as those pixels having a flag set within a data structure indicating pixels which display values have changed since a last display request.

26. The method of claim 1 wherein the step of accessing the data structures to provide an image display comprises determining a display value for a pixel for a three-dimensional (transparency) application based upon a composite of pixel value entries in corresponding data structures.

27. The method of claim 1 wherein the step of accessing the data structures to provide an image display comprises determining a display value for a pixel for a two-dimensional (priority) application based upon a pixel value of a highest priority pixel value entry in corresponding data structures.

28. The method of claim 27 wherein the step of determining a display value for a pixel for a two-dimensional (priority) application comprises determining a pixel value of a highest priority commonly used overlay having a flag set for the pixel within corresponding data structures.

29. The method of claim 1 wherein the step of accessing the data structures to provide an image display comprises unsetting a subset of flags within a certain data structure indicating pixels which display values have changed since a last display request.

30. An apparatus for managing pixel image data, said apparatus comprising:

means for initializing linked list data structures in memory for storage and management of a changing subset of selected sets of pixel image data, wherein each of the selected sets represents an object to be displayed on a display screen, wherein non-header and non-free nodes of the data structures contain pixel image data corresponding to a single pixel on the display screen;

means for adding certain subsets of said selected sets of pixel image data to said data structures;

means for deleting certain subsets of said selected sets of pixel image data from said data structures;

means for accessing said data structures to provide an image display on the display screen; and means for altering a single non-header and non-free node of said data structures and redisplaying a single pixel of the display screen, to alter an individual pixel of a representation of an object to be displayed.

31. The apparatus of claim 30 wherein said means for initializing data structures comprises means for determining whether a two-dimensional (priority) or three-dimensional (transparency) application is requested.

32. The apparatus of claim 30 wherein said means for initializing data structures comprises means for determining a number of bits required for overlay status information.

33. The apparatus of claim 32 wherein said means for determining said number of bits required for overlay status information comprises means for determining said number of bits to be used for priorities, z-buffering and shading information.

34. The apparatus of claim 30 wherein said means for initializing data structures comprises means for determining a number of bits required for pixel value nodes and for pixel header nodes, wherein each pixel header node is a first node in a linked list.

35. The apparatus of claim 30 wherein said means for initializing data structures comprises means for determining a number, priority, and pixel values of commonly used overlays.

36. The apparatus of claim 30 wherein said means for initializing data structures comprises means for initializing a data structure indicating pixels which display values have changed since a last display request.

37. The apparatus of claim 30 wherein said means for initializing data structures comprises means for initializing pixel header nodes to linked lists of pixel value nodes.

38. The apparatus of claim 37 wherein said means for initializing said pixel header nodes comprises means for initializing a pointer to a first pixel value node in a linked list.

39. The apparatus of claim 37 wherein said means for initializing said pixel header nodes comprises means for initializing prioritized bit fields for indication of extant commonly used overlays.

40. The apparatus of claim 30 wherein said means for initializing data structures comprises means for initializing free lists of pixel value nodes, wherein each free list comprises free nodes, wherein each free node is available for incorporation into a data structure corresponding to an object to be displayed on the display screen.

41. The apparatus of claim 40 wherein said means for initializing said free lists of pixel value nodes comprises:

means for initializing pixel value nodes; and means for inserting each pixel value node within a free list within a same memory block.

42. The apparatus of claim 41 wherein said means for initializing said pixel value nodes comprises means for initializing pointers to a next pixel value node in a corresponding linked list of pixel value nodes.

43. The apparatus of claim 41 wherein said means for initializing said pixel value nodes comprises means for initializing overlay status fields.

44. The apparatus of claim 41 wherein said means for initializing said pixel value nodes comprises means for initializing image value fields.

45. The apparatus of claim 30 wherein said means for adding certain subsets of said selected sets of pixel image data to said data structures comprises means for adding image data independently for each pixel, from each selected set of pixel image data, to said data structures.

46. The apparatus of claim 45 wherein said means for adding image data independently for each pixel comprises means for setting a flag within a commonly used overlay field within corresponding data structures.

47. The apparatus of claim 45 wherein said means for adding image data independently for each pixel comprises means for ordering entries in said data structures by priority of said sets of pixel image data.

48. The apparatus of claim 45 wherein said means for adding image data independently for each pixel comprises means for ordering entries in said data structures by z-buffer position of said sets of pixel image data.

49. The apparatus of claim 30 wherein said means for adding certain subsets of said selected sets of pixel image data to said data structures comprises means for setting flags within a certain data structure, specifying pixels which display values have changed, thereby indicating pixels which display values have changed since a last display request.

50. The apparatus of claim 30 wherein said means for deleting certain subsets of said selected sets of pixel image data from said data structures comprises means for deleting image data independently for each pixel, from each selected set of pixel image data, from said data structures.

51. The apparatus of claim 50 wherein said means for deleting image data independently for each pixel comprises means for unsetting a flag within a commonly used overlay field within corresponding data structures.

52. The apparatus of claim 30 wherein said means for deleting certain subsets of said selected sets of pixel image data from said data structures comprises means for setting flags within a certain data structure, specifying pixels which display values have changed, thereby indicating pixels which display values have changed since a last display request.

53. The apparatus of claim 30 wherein said means for accessing said data structures to provide an image display comprises means for accessing image data independently for each pixel, from a preselected subset of pixels, within said data structures.

54. The apparatus of claim 53 further comprising means for establishing said subset of pixels as those pixels having a flag set within a data structure indicating pixels which display values have changed since a last display request.

55. The apparatus of claim 30 wherein said means for accessing said data structures to provide an image display comprises means for determining a display value for a pixel for a three-dimensional (transparency) application based upon a composite of pixel value entries in corresponding data structures.

56. The apparatus of claim 30 wherein said means for accessing said data structures to provide an image display comprises means for determining a display value for a pixel for a two-dimensional (priority) application based upon a pixel value of a highest priority pixel value entry in corresponding data structures.

57. The apparatus of claim 56 wherein said means for determining a display value for a pixel for a two-dimensional (priority) application comprises means for determining a pixel value of a highest priority commonly used overlay having a flag set for said pixel within corresponding data structures.

58. The apparatus of claim 30 wherein said means for accessing said data structures to provide an image display comprises means for unsetting a subset of flags within a certain data structure indicating pixels which display values have changed since a last display request.

59. The apparatus of claim 30 wherein one or more of said means comprise software.

60. The apparatus of claim 30 wherein one or more of said means comprise firmware.

* * * * *